United States Patent [19]
Nukina et al.

[11] 3,893,853
[45] July 8, 1975

[54] PROCESS OF PREPARING PHOTOCONDUCTIVE POLY-N-VINYL-CARBAZOLE TYPE CHARGE-TRANSFER COMPLEXES

[75] Inventors: Kenji Nukina, Showa; Yoshi Arai, Oyama, both of Japan

[73] Assignees: Dainippun Ink & Chemicals Inc., Tokyo; Dainippun Ink Institute of Chemical Research, both of Japan

[22] Filed: June 10, 1974

[21] Appl. No.: 478,054

Related U.S. Application Data

[63] Continuation of Ser. No. 260,191, June 6, 1972, abandoned.

[30] Foreign Application Priority Data

Jan. 8, 1972  Japan.................................. 47-4457

[52] U.S. Cl............... 96/1.5 C; 96/1.6; 260/88.3 R; 260/315
[51] Int. Cl............................................... G03g 5/06
[58] Field of Search..................... 96/1.5, 1.5 C, 1.6; 260/88.3 R, 315

[56] References Cited
UNITED STATES PATENTS

| | | | |
|---|---|---|---|
| 3,232,755 | 2/1966 | Hoegl et al. | 96/1.5 X |
| 3,484,237 | 12/1969 | Shattuck | 96/1.5 |
| 3,488,705 | 1/1970 | Fox et al. | 96/1.6 |
| 3,512,966 | 5/1970 | Shattuck et al. | 96/1.6 X |
| 3,661,879 | 5/1972 | Van Dam et al. | 96/1.5 X |
| 3,697,264 | 10/1972 | Podbajny | 96/1.5 |
| 3,752,668 | 8/1973 | Baltazzi | 96/1.5 |

Primary Examiner—Norman G. Torchin
Assistant Examiner—John R. Miller
Attorney, Agent, or Firm—Sherman and Shalloway

[57]  ABSTRACT

A process for preparing a charge-transfer complex with improved photoconductivity which comprises reacting poly-N-vinylcarbazole with tetranitro-9-fluorenone in a solvent of chlorinated hydrocarbon-ketone mixture in a 9:1 – 4:6 volume ratio.

6 Claims, No Drawings

PROCESS OF PREPARING PHOTOCONDUCTIVE POLY-N-VINYL-CARBAZOLE TYPE CHARGE-TRANSFER COMPLEXES

This is a continuation of application Ser. No. 260,191, filed June 6, 1972, now abandoned.

This invention relates to a process of preparing photoconductive poly-N-vinylcarbazole type charge-transfer complexes or a process of photosensitizing the N-vinyl-carbazole type polymers.

While numerous studies have been made as to the use of the inorganic and organic substances as the photoconductive material in electrophotography, the inorganic substances, in view of their superiority in such respects as sensitivity and other points, have been put to practical use, those in use including, for example, selenium, zinc oxide and cadmium sulfide. While the organic substances excel in such points as flexibility, light transmittance and film-forming ability and also have the advantage of being light in weight, in view of their generally low sensitivity, the only substance that can be expected to become practically useful by its photosensitization is the N-vinyl-carbazole type polymer.

For this reason, numerous proposals have been made as to how to photosensitize the N-vinylcarbazole polymer. However, the conventional photosensitizing methods have the following shortcomings:

1. Adequate photosensitization cannot be achieved. Further, even though the photosensitization is achieved, the sensitivity achieved is lower than in the case of zinc oxide.

2. Since the dark current increases when the photosensitizer is cause to act on the polymer, the surface charge cannot be maintained for a prolonged period of time. That is, an image having a high contrast cannot be obtained.

3. The surface charge does not become zero even though it is exposed to light. That is, when a photoconductive material of this sort is used in electrophotography, fogging of an image will take place.

An object of the present invention is therefore to provide a process by which the N-vinylcarbazole polymers can be photosensitized without the accompaniment of the shortcomings such as noted hereinabove.

Another object of the invention is to provide photosensitized poly-N-vinylcarbazole type compounds which are of use as photoconductive materials.

Other objects and advantages of the invention will become apparent from the following description.

It has now been found that the N-vinylcarbazole polymers can be photosensitized by reacting the N-vinylcarbazole polymer with tetranitro-9-fluorenone in a solvent mixture consisting of a chlorinated hydrocarbon and a ketone mixed in a volume ratio of 9:1 – 4:6, and preferably 8:2 – 5:5. The compound obtained by this reaction is a charge-transfer complex (molecular compound) formed on the basis of the transfer of electrons between the N-vinylcarbazole polymer (electron donor) and the tetranitro-9-fluorenone (electron acceptor). This charge-transfer complex has a sensitivity about 2 – 4 times that of zinc oxide, and the surface charge accepted from negative corona has a lesser tendency of being attenuated by the dark current. Further since the surface charge becomes zero within a few seconds when exposed to light, the hereinbefore noted shortcomings (1), (2) and (3) can be almost completely eliminated by the use of the foregoing complex.

It is hypothesized that the photosensitization of the N-vinylcarbazole polymer has been made possible in the present invention, as hereinbefore described, for the following reason. That is, as a result of the discovery of the aforesaid chlorinated hydrocarbon-ketone mixture of a specified composition as being a solvent which can satisfactorily dissolve the tetranitro-9-fluorenone, a compound heretofore considered to be difficultly soluble, it has become possible to react the N-vinylcarbazole polymer with the tetranitro-9-fluorenone in a state wherein the latter is in solution in the solvent at a relatively high concentration, with the consequence that the tetranitro-9-fluorenone reacts with the N-vinylcarbazole polymer at a high rate to form the charge-transfer complex.

As the N-vinylcarbazole type polymers, in addition to the N-vinylcarbazole homopolymer, such copolymers as, for example, N-vinylcarbazole and such other monomers as vinyl acetate, vinyl chloride, acrylic compounds, etc. can be named method of the present invention can be applied to any of the N-vinylcarbazole type polymers as long as they are those which have been manufactured for photoconductive use.

As the tetranitro-9-fluorenone, convenient examples include such as 2,4,5,7-tetranitro-9-fluorenone and 2,3,6,7-tetranitro-9-fluorenone. Usually, the tetranitro-9-fluorenone is preferably reacted with the N-vinylcarbazole polymer at the rate of 30 – 220 parts by weight of the former per 100 parts by weight of the latter.

In the present invention the solvent mixture of a chlorinated hydrocarbon such as dichloromethane, 1,2-dichloroethane, 1,1-dichloroethane, trichloroethylene, chlorobenzene, etc., and a ketone such as acetone, methyl ethyl ketone, acetophenone, acetonyl acetone, cyclohexanone, etc., mixed in a volume ratio of 9:1 – 4:6 is used as the reaction medium. When the chlorinated hydrocarbon is used at a rate exceeding this limit, the solubility of the tetranitro-9-fluorenone becomes poor, whereas when the amount of the chlorinated hydrocarbon used is below this limit, the solubility of the N-vinylcarbazole becomes poor. Thus, neither of these cases is desirable.

The reaction between the N-vinylcarbazole polymer and the tetranitro-9-fluorenone is preferably carried out by dissolving the N-vinylcarbazole polymer and the tetranitro-9-fluorenone in the aforesaid solvent mixture at the fore-going ratio and such that the N-vinylcarbazole polymer is contained in the solvent mixture in the range of 2 – 15 weight %, and thereafter heating the solution for 1 – 10 hours at a temperature ranging from 50°C. to the reflux temperature.

The invention will now be more specifically illustrated by reference to the following non-limitative examples.

EXAMPLES I – XII

The N-vinylcarbazole polymer and tetranitro-9-fluorenone indicated in the following table were dissolved in the solvent indicated in the same table, after which the resulting solution was charged to a condenser-equipped flask and heated for 8 hours at the reflux temperature.

The so obtained poly-N-vinylcarbazole type charge-transfer complex solution was applied to an aluminum plate thereby preparing a photoconductive plate for electrophotographic use. This photoconductive plate was applied a corona charge of −7 KV, and the initial potential and the potential after standing for 15 seconds were measured. The photoconductive plate was then exposed to light of 20 lux, and the time required for the change to decrease to half and the time required for the charge to decrease to half and the time required to become zero were measured. The value obtained by multiplying the time required for the charge to decrease to half by the intensity of illumination is designated sensitivity I and the value obtained by multiplying the time for the charge to become zero by the intensity of illumination is designated sensitivity II. Both these values are shown in the following table.

acting 100 parts by weight of poly-N-vinylcarbazole with 30 – 220 parts by weight of tetranitro-9-fluorenone for a period of 1 to 10 hours at a temperature of from 50° to the reflux temperature in a solvent of a chlorinated hydrocarbon-ketone mixture having a 9:1 – 4:6 volume ratio, said poly-N-vinylcarbazole being used in an amount of 2 – 15% by weight based on the solvent.

2. The process of claim 1 wherein said poly-N-vinylcarbazole is a copolymer composed of at least 60% by weight of N-vinylcarbazole and at most 40% by weight of vinyl acetate.

3. The process of claim 1 wherein said poly-N-

| Example | N-vinylcarbazole type polymer | Tetranitro-9-fluorenone | Solvent | Initial potential (V) | Potential 15 minutes later (V) | Sensitivity (Lux-Sec) I | II |
|---|---|---|---|---|---|---|---|
| I (control) | poly-N-vinyl-carbazole* (10.0 g) | 2,4,5,7-tetranitro-9-fluorenone (2.0 g) | dichloromethane (100 cc) | 310 | 254 | 22 | 272 |
| II (control) | N-vinylcarbazole-vinyl acetate copolymer** (10.0 g) | do. (2.5 g) | chlorobenzene (100 cc) | 360 | 334 | 16 | 280 |
| III | do.** (10.0 g) | do. (3.0 g) | chlorobenzene (90 cc) acetone (10 cc) | 440 | 400 | 12 | 190 |
| IV | do.** (10.0 g) | do. (4.0 g) | chlorobenzene (80 cc) acetone (20 cc) | 420 | 380 | 7 | 75 |
| V | do.** (10.0 g) | do. (5.0 g) | chlorobenzene (70 cc) acetone (30 cc) | 420 | 370 | 6 | 72 |
| VI | do.** (10.0 g) | do. (6.0 g) | chlorobenzene (60 cc) acetone (40 cc) | 400 | 370 | 5 | 70 |
| VII | do.** (7.0 g) do.***(3.0 g) | do. (4.0 g) | 1,2-dichloro-ethane (70 cc) acetone (30 cc) | 500 | 420 | 8 | 80 |
| VIII | poly-N-vinyl-carbazole* (10.0 g) | 2,3,6,7-tetranitro-9-fluorenone (4.0 g) | 1,2-dichloro-ethane (70 cc) acetone (30 cc) | 300 | 246 | 6 | 75 |
| IX | N-vinylcarbazole-vinyl acetate copolymer**** (10.0 g) | 2,4,5,7-tetranitro-9-fluorenone (4.0 g) | chlorobenzene (80 cc) acetophenone (20 cc) | 480 | 440 | 8 | 85 |
| X | do.****(10.0g) | do. (5.0 g) | chlorobenzene (70 cc) cyclohexanone (30 cc) | 480 | 430 | 7 | 75 |
| XI | do.** (10.0 g) | 2,3,6,7-tetranitro-9-fluorenone (4.0 g) | chlorobenzene (50 cc) methyl ethyl ketone (50 cc) | 470 | 450 | 9 | 85 |
| XII | do.** (5.0 g) | 2,4,5,7-tetranitro-9-fluorenone (11.0 g) | chlorobenzene (140 cc) acetone (60 cc) | 415 | 395 | 5 | 68 |

*LUVICAN M-170, a product of Badische Anilin-und Sodafabrick A.G.
**A copolymer of N-vinylcarbazole and vinyl acetate in a weight ratio of 80:20 (Intrinsic viscosity as measured in benzol = $3 \times 10^{-5}$)
***A copolymer of N-vinylcarbazole and vinyl acetate in a weight ratio of 60:40 (Intrinsic viscosity as measured in benzol = $3 \times 10^{-5}$)
****A copolymer of N-vinylcarbazole and vinyl acetate in a weight ratio of 70:30 (Intrinsic viscosity as measured in benzol = $3 \times 10^{-5}$).

From the data shown in the foregoing table it can be appreciated that by the use of the poly-N-vinylcarbazole type charge-transfer complex of the present invention as the photoconductive material a photoconductive film coating is formed, which demonstrates excellent sensitivity, as well as in which the tendency to attenuation of the surface charge by means of the dark current is checked and also in which the surface charge becomes zero in a relatively short period of time on exposure to light.

We claim:

1. A process of preparing a charge-transfer complex with improved photoconductivity which comprises revinylcarbazole is a homopolymer of N-vinylcarbazole.

4. The process of claim 1 wherein said tetranitro-9-fluorenone is 2,4,5,7-tetranitro-9-fluorenone.

5. The process according to claim 1 wherein said tetranitro-9-fluorenone is 2,3,6,7-tetranitro-fluorenone.

6. The process of claim 1 wherein said chlorinated hydrocarbon is selected from the group consisting of chlorobenzene and 1,2-dichloroethane, and said ketone is selected from the group consisting of acetone, methyl ethyl ketone, acetophenone and cyclohexanone.

* * * * *